United States Patent
Seo et al.

(10) Patent No.: US 11,961,681 B2
(45) Date of Patent: Apr. 16, 2024

(54) MULTILAYER CAPACITOR INCLUDING INTERNAL ELECTRODES HAVING PORES ON ENDS THEREOF AND BOARD HAVING THE SAME MOUNTED THEREON

(71) Applicant: SAMSUNG ELECTRO-MECHANICS CO., LTD., Suwon-si (KR)

(72) Inventors: Yu Kwang Seo, Suwon-si (KR); Berm Ha Cha, Suwon-si (KR); Kang Hyun Lee, Suwon-si (KR); Jong Hwa Lee, Suwon-si (KR); Jong Han Kim, Suwon-si (KR)

(73) Assignee: SAMSUNG ELECTRO-MECHANICS CO., LTD., Suwon-si (KR)

(*) Notice: Subject to any disclaimer, the term of this patent is extended or adjusted under 35 U.S.C. 154(b) by 265 days.

(21) Appl. No.: 17/523,179

(22) Filed: Nov. 10, 2021

(65) Prior Publication Data
US 2022/0208472 A1     Jun. 30, 2022

(30) Foreign Application Priority Data

Dec. 28, 2020  (KR) .......... 10-2020-0184165
May 26, 2021  (KR) .......... 10-2021-0067719

(51) Int. Cl.
*H01G 4/30*     (2006.01)
*H01G 2/06*     (2006.01)
(Continued)

(52) U.S. Cl.
CPC .............. *H01G 4/30* (2013.01); *H01G 2/065* (2013.01); *H01G 4/008* (2013.01); *H01G 4/012* (2013.01); *H01G 4/12* (2013.01); *H01G 4/224* (2013.01)

(58) Field of Classification Search
CPC .......... H01G 4/30; H01G 2/065; H01G 4/008; H01G 4/012; H01G 4/224; H01G 2/06;
(Continued)

(56) References Cited

U.S. PATENT DOCUMENTS

2009/0310276 A1*  12/2009  Tashima ............ H01G 4/30
                                                29/25.42
2011/0110014 A1*  5/2011  Hirata ............... H01G 4/30
                                                156/89.12

(Continued)

FOREIGN PATENT DOCUMENTS

JP     2012-129508 A     7/2012
KR    10-1197921 B1    11/2012
(Continued)

*Primary Examiner* — David M Sinclair
*Assistant Examiner* — Daniel M Dubuisson
(74) *Attorney, Agent, or Firm* — Morgan, Lewis & Bockius LLP

(57) ABSTRACT

A multilayer capacitor includes a capacitor body including dielectric layers and internal electrodes alternately disposed with the dielectric layers interposed therebetween; and an external electrode disposed on the capacitor body to be connected to one or more of the internal electrodes. Porosity of ends of the internal electrodes is less than 50% on an interfacial surface between a margin of the capacitor body in a width direction the capacitor body and the internal electrodes.

9 Claims, 9 Drawing Sheets

(51) Int. Cl.
  *H01G 4/008* (2006.01)
  *H01G 4/012* (2006.01)
  *H01G 4/12* (2006.01)
  *H01G 4/224* (2006.01)

(58) Field of Classification Search
  CPC .... H01G 4/2325; H01G 4/232; H01G 4/0085; H01G 4/005; H01G 4/1218
  See application file for complete search history.

(56) References Cited

U.S. PATENT DOCUMENTS

| | | | |
|---|---|---|---|
| 2011/0141655 A1* | 6/2011 | Jeong | H01G 4/005 |
| | | | 361/306.3 |
| 2011/0141660 A1* | 6/2011 | Jeong | H01G 4/12 |
| | | | 361/321.2 |
| 2012/0162858 A1 | 6/2012 | Tanaka et al. | |
| 2013/0094118 A1 | 4/2013 | Kim et al. | |
| 2014/0301015 A1* | 10/2014 | Kim | H01G 4/12 |
| | | | 29/25.03 |
| 2015/0348712 A1* | 12/2015 | Lee | H01G 4/30 |
| | | | 156/89.12 |
| 2016/0042864 A1 | 2/2016 | Hong et al. | |
| 2016/0196918 A1* | 7/2016 | Hong | H01G 4/232 |
| | | | 361/301.4 |
| 2018/0012702 A1* | 1/2018 | Azuma | H01G 4/248 |
| 2018/0096791 A1 | 4/2018 | Nishisaka et al. | |
| 2018/0108482 A1* | 4/2018 | Kogure | H01G 4/224 |
| 2018/0182555 A1* | 6/2018 | Kowase | H01G 4/12 |
| 2019/0035554 A1* | 1/2019 | Inomata | H01G 4/12 |
| 2019/0189352 A1 | 6/2019 | Yamato et al. | |
| 2019/0259535 A1* | 8/2019 | Kowase | H01G 4/228 |
| 2019/0348222 A1* | 11/2019 | Kato | H01G 4/30 |
| 2020/0098519 A1* | 3/2020 | Kusumoto | H01G 4/232 |
| 2020/0126722 A1* | 4/2020 | Fukunaga | H01G 4/306 |
| 2020/0402717 A1* | 12/2020 | Lee | H01G 4/30 |
| 2022/0059289 A1* | 2/2022 | Tanaka | H01G 4/30 |

FOREIGN PATENT DOCUMENTS

| | | |
|---|---|---|
| KR | 10-2016-0016385 A | 2/2016 |
| KR | 10-2018-0037591 A | 4/2018 |
| KR | 10-2019-0072414 A | 6/2019 |

* cited by examiner

MULTILAYER CAPACITOR INCLUDING INTERNAL ELECTRODES HAVING PORES ON ENDS THEREOF AND BOARD HAVING THE SAME MOUNTED THEREON

CROSS-REFERENCE TO RELATED APPLICATION(S)

This application claims benefit of priority to Korean Patent Application No. 10-2020-0184165 filed on Dec. 28, 2020 and Korean Patent Application No. 10-2021-0067719 filed on May 26, 2021 in the Korean Intellectual Property Office, the disclosures of which are incorporated herein by reference in their entirety.

TECHNICAL FIELD

The present disclosure relates to a multilayer capacitor and a board having the same mounted thereon.

BACKGROUND

A multilayer ceramic capacitor (MLCC) is a passive component and may control an electrical signal in a circuit.

Recently, in accordance with miniaturization of and reductions in weight of electronic devices, the development of a multilayer capacitor used for electronic devices has also been developed in a direction of high capacity and miniaturization.

To develop a multilayer capacitor having a reduced size with high capacity, it may be necessary to reduce a thickness of a dielectric layer, but when the dielectric layer has a reduced thickness, an electric field applied per unit thickness of a dielectric may increase by an equal amount of driving voltage, and accordingly, insulation resistance may be easily lowered, which may cause a difficulty in driving the electronic device.

In particular, under a high-temperature and high-humidity load environment, an internal electrode and a dielectric layer may be easily peeled, and accordingly, insulation resistance of a multilayer capacitor may also decrease more easily. The decrease in insulation resistance may deteriorate moisture resistance reliability of the multilayer capacitor.

SUMMARY

An aspect of the present disclosure is to provide a multilayer capacitor having improved moisture resistance reliability and a board having the same mounted thereon.

According to an aspect of the present disclosure, a multilayer capacitor includes a capacitor body including dielectric layers and internal electrodes alternately disposed with the dielectric layers interposed therebetween; and an external electrode disposed on the capacitor body to be connected to one of more of the internal electrode. Porosity of ends of the internal electrodes is less than 50% on an interfacial surface between a margin of the capacitor body in a width direction of the capacitor body and the internal electrodes.

In the example embodiment, the capacitor body may include first and second surfaces opposing each other in a first direction, and third and fourth surfaces opposing each other in a second direction different from the first direction, and the internal electrodes may include first and second internal electrodes alternately disposed in the first direction, and the external electrode includes first and second external electrodes disposed on third and fourth surfaces of the capacitor body and connected to the first and second external electrodes, respectively.

In the example embodiment, the capacitor body may include an active region in which the first and second internal electrodes overlap each other in the first direction, and upper and lower covers disposed on upper and lower surfaces of the active region, respectively.

In the example embodiment, the multilayer capacitor further may include a plating layer disposed on the external electrode.

In the example embodiment, the capacitor body may be baked by raising a temperature from 600° C. to 900° C. at a rate of 3000° C./min or more during baking.

According to an aspect of the present disclosure, a board on which a multilayer capacitor is mounted includes a board having a plurality of electrode pads on one surface; and a multilayer capacitor mounted with an external electrode connected to the electrode pad.

According to an aspect of the present disclosure, a multilayer capacitor includes a capacitor body including dielectric layers and internal electrodes alternately disposed with the dielectric layers interposed therebetween, the capacitor body including first and second surfaces opposing each other in a thickness direction of the capacitor body, third and fourth surfaces opposing each other in a length direction of the capacitor body, and fifth and sixth surfaces opposing each other in a width of the capacitor body, and the internal electrodes including first internal electrodes extending from the first surface and the second internal electrodes extending from the second surface; and first and second external electrode disposed on the third surface and the fourth surface to be connected to the first internal electrodes and the second internal electrodes, respectively. In a width direction-thickness direction plane, a ratio of the number of internal electrodes each having a pore at an end thereof located at a side of one the fifth and sixth surfaces to the number of the internal electrodes is less than 50%.

The ratio may be 24% or more.

The ratio may be greater than 0.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
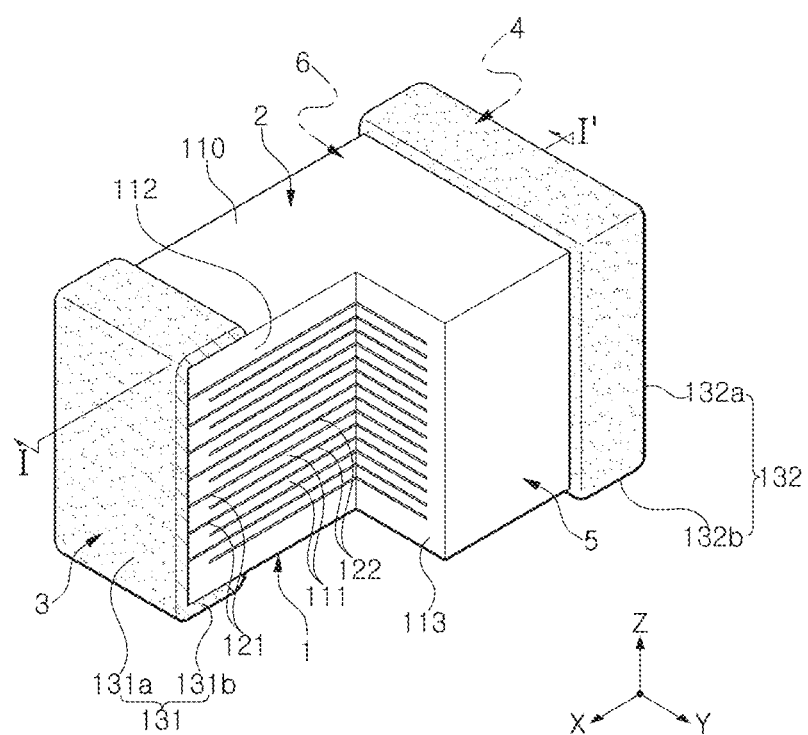
FIG. 1 is a perspective diagram illustrating a multilayer capacitor, a portion of which is cut out, according to an example embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein.

Rather, these embodiments are provided so that this disclosure will be thorough and complete, and will fully convey the scope of the disclosure to those skilled in the art.

Shapes and sizes of elements in the drawings may be exaggerated for clarity of description, and elements indicated by the same reference numeral are same elements in the drawings.

Also, it will be understood that when a portion "includes" an element, it may further include another element, not excluding another element, unless otherwise indicated.

As for a direction of the capacitor body 110, X, Y, and Z in the drawings represent a length direction, a width direction, and a thickness direction of the capacitor body 110, respectively.

The Z direction may be the same direction as a lamination direction in which dielectric layers are laminated.

Figure 2A:
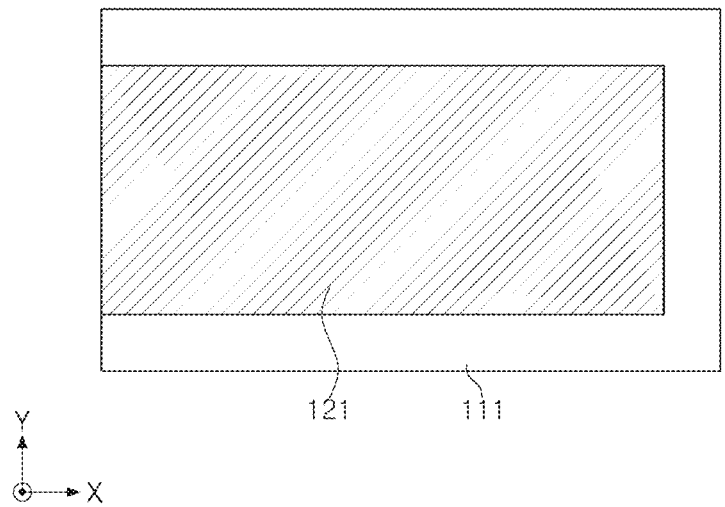
FIGS. 2A and 2B are plan diagrams illustrating first and second internal electrodes illustrated in FIG. 1.
Figure 2B:
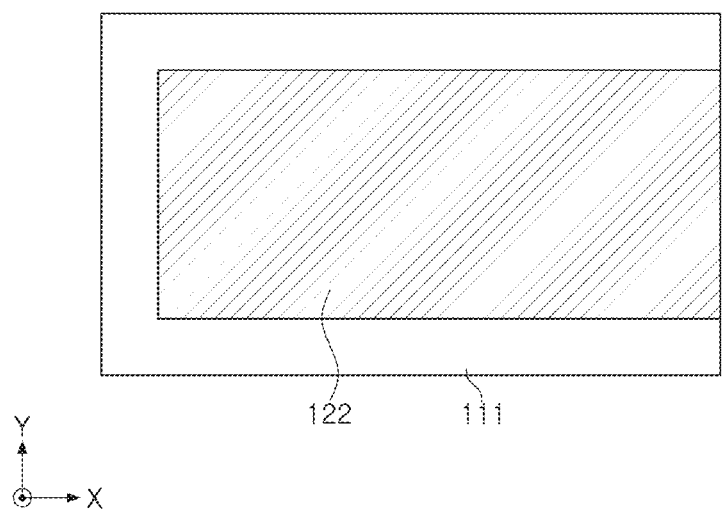
Figure 3:
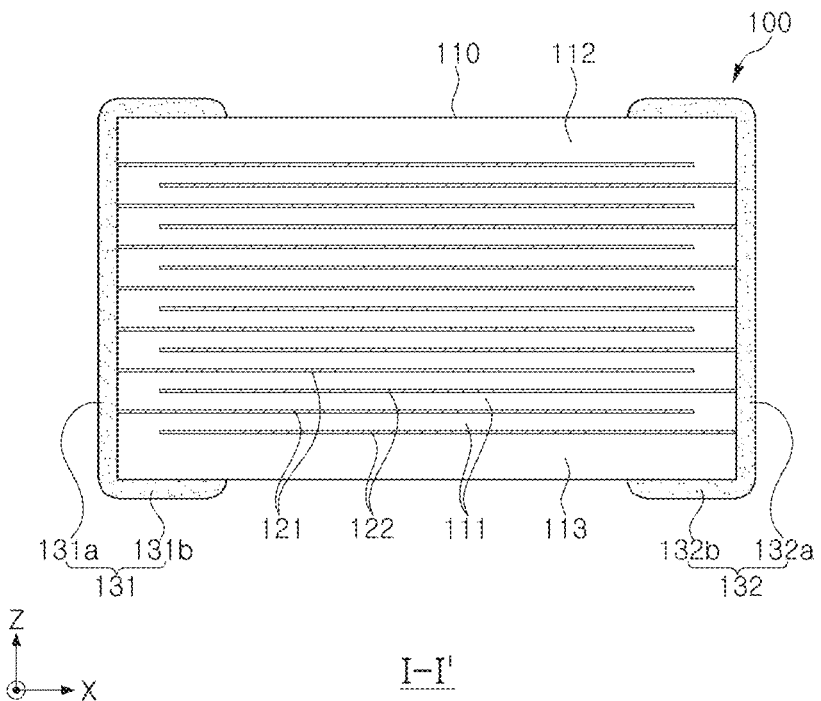
FIG. 3 is a cross-sectional diagram taken along line I-I' in FIG. 1.

FIG. 1 is a perspective diagram illustrating a multilayer capacitor, a portion of which is cut out, according to an example embodiment. FIGS. 2A and 2B are plan diagrams illustrating first and second internal electrodes illustrated in FIG. 1. FIG. 3 is a cross-sectional diagram taken along line I-I' in FIG. 1.

Referring to FIGS. 1 to 3, a multilayer capacitor 100 according to an example embodiment may include a capacitor body 110 and first and second external electrodes 131 and 132.

The capacitor body 110 may include a plurality of dielectric layers 111 and a plurality of first internal electrodes 121 and second internal electrodes 122 alternately disposed in the Z direction with the dielectric layers 111 interposed therebetween.

The capacitor body 110 may be obtained by laminating the plurality of dielectric layers 111 in the Z direction and baking the dielectric layers, and boundaries between the dielectric layers 111 of the capacitor body 110 adjacent to each other may be integrated such that it may be difficult to identify boundaries therebetween without using a scanning electron microscope (SEM).

The capacitor body 110 may have a substantially hexahedral shape, but an example embodiment thereof is not limited thereto. Also, the shape and dimensions of the capacitor body 110 and the number of laminated dielectric layers 111 are not limited to the examples illustrated in the drawings.

In the example embodiment, both surfaces of the capacitor body 110 opposing each other in the Z direction may be defined as first and second surfaces 1 and 2, both surfaces connected to the first and second surfaces 1 and 2 and opposing in the X direction may be defined as third and fourth surfaces 3 and 4, and both surfaces connected to the first and second surfaces 1 and 2 and the third and fourth surfaces 3 and 4 and opposing each other in the Y direction may be defined as fifth and sixth surfaces 5 and 6.

Also, in the example embodiment, the surface on which the multilayer capacitor 100 is mounted may be the first surface 1 of the capacitor body 110.

The dielectric layers 111 may include a high-k ceramic material, a barium titanate ($BaTiO_3$) or a strontium titanate ($SrTiO_3$) ceramic powder, for example, but an example embodiment thereof is not limited thereto as long as sufficient capacitance is able to be obtained.

The dielectric layers 111 may further include ceramic additives, organic solvents, plasticizers, binders, and dispersants in addition to ceramic powder.

As the ceramic additives, a transition metal oxide or a transition metal carbide, a rare earth element, magnesium (Mg) or aluminum (Al) may be used.

The capacitor body 110 may include an active region contributing to the formation of capacitance of the capacitor, and upper and lower covers 112 and 113 formed above and below the active region in the Z direction as upper and lower margin portions.

The upper and lower covers 112 and 113 may have a material and a configuration the same as those of the first and second dielectric layers 111 and 112 other than the configuration in which the upper and lower covers do not include internal electrodes.

The upper and lower covers 112 and 113 may be formed by laminating a single dielectric layer or two or more dielectric layers on upper and lower surfaces of the active region in the Z direction, respectively, and may prevent damages to the first and second internal electrodes 121 and 122 caused by physical or chemical stress.

The first and second internal electrodes 121 and 122 may be applied with different polarities, and may be alternately disposed in the Z direction with the dielectric layer 111 interposed therebetween, and one ends thereof may be exposed to the third and fourth surfaces 3 and 4 of the capacitor body 110, respectively.

In this case, the first and second internal electrodes 121 and 122 may be electrically insulated from each other by the dielectric layer 111 disposed therebetween.

Accordingly, the ends of the first and second internal electrodes 121 and 122, alternately exposed through (or be in contact with or extend from) the third and fourth surfaces 3 and 4 of the capacitor body 110, may be electrically connected to the first and second external electrodes 131 and 132 disposed on the third and fourth surfaces 3 and 4 of the capacitor body 110, respectively.

Also, on the Y-Z direction cross-sectional surface of the capacitor body 110, porosity of ends of the internal electrodes on an interfacial surface between a margin of the capacitor body 110 in the Y direction and the internal electrodes may be less than 50%.

That is, the first and second internal electrodes having pores at the ends at the interfacial surface between the Y-direction margin of the capacitor body 110 and the first and second internal electrodes in the Y-direction are included in the entire first and second internal electrodes. Porosity may be less than 50%. In one example, porosity may be less than 50% and greater than 0. In one example, porosity may refer to a ratio of the number of the first and second internal electrodes each having a pore at an end thereof at the interfacial surface between the Y-direction margin of the capacitor body 110 and the first and second internal electrodes in the Y-direction to the total number of the first and second internal electrodes.

By the above configuration, when a predetermined voltage is applied to the first and second external electrodes 131 and 132, electrical charges may be accumulated between the first and second internal electrodes 121 and 122.

In this case, capacitance of the multilayer capacitor 100 may be proportional to a region of overlap between the first and second internal electrodes 121 and 122, overlapping each other in the Z direction in the active region.

Also, a material for forming the first and second internal electrodes 121 and 122 is not limited to any particular material, and the first and second internal electrodes 121 and 122 may be formed using a conductive paste formed of a noble metal material such as platinum (Pt), palladium (Pd), a palladium-silver (Pd—Ag) alloy, and at least one of nickel (Ni) and copper (Cu).

In this case, as the method of printing the conductive paste, a screen-printing method or a gravure printing method may be used, and an example embodiment thereof is not limited thereto.

The first and second external electrodes 131 and 132 may be provided with voltages of different polarities, may be disposed on both ends of the capacitor body 110, and may be electrically connected to the exposed portions of the first and second internal electrodes 121 and 122, respectively.

In this case, the first and second external electrodes 131 and 132 may include conductive layers formed on the third and fourth surfaces 3 and 4 of the capacitor body 110, and plating layers formed on the conductive layers.

The plating layer may include a nickel (Ni) plated layer formed on the conductive layer and a tin (Sn) plated layer formed on the nickel (Ni) plated layer.

The first external electrode 131 may include a first connection portion 131a and a first band portion 131b.

The first connection portion 131a may be formed on the third surface 3 of the capacitor body 110 and may be connected to an exposed portion of the first internal electrode 121, and the first band portion 131b may extend from the first connection portion 131a to a portion of the first surface 1 of the capacitor body 110.

In this case, the first band portion 131b may further extend to a portion of the fifth and sixth surfaces 5 and 6 of the capacitor body 110 and a portion of the second surface 2 so as to improve adhesion strength.

The second external electrode 132 may include a second connection portion 132a and a second band portion 132b.

The second connection portion 132a may be formed on the fourth surface 4 of the capacitor body 110 and may be connected to an exposed portion of the second internal electrode 122, and the second band portion 132b may extend from the second connection portion 132a to a portion of the first surface 1 of the capacitor body 110.

In this case, the second band portion 132b may further extend to a portion of the fifth and sixth surfaces 5 and 6 of the capacitor body 110 and a portion of the second surface 2 so as to improve adhesion strength.

Figure 4:
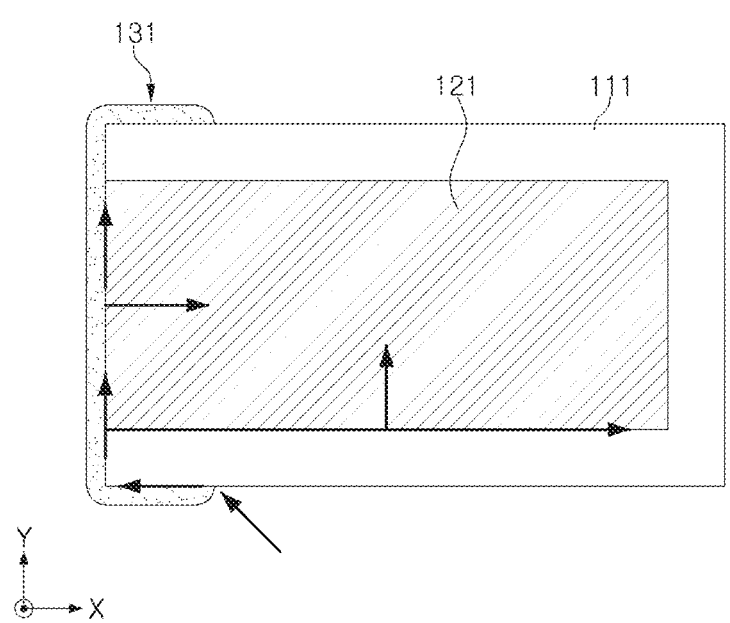
FIG. 4 is a cross-sectional diagram illustrating a path of moisture permeation into a capacitor body.

FIG. 4 is a cross-sectional diagram illustrating a path of moisture permeation into a capacitor body.

Referring to FIG. 4, in a multilayer capacitor under conditions of high temperature and high humidity, moisture supplied from the outside or a plating solution may permeate into the capacitor body in the order of an interfacial surface between the capacitor body and the external electrode, an interfacial surface between the external electrode and the internal electrode, an interfacial surface between the internal electrode and the dielectric margin, and an interfacial surface between the internal electrode and the dielectric layer, and accordingly, ionized peeling may occur such that moisture resistance reliability of the multilayer capacitor may degrade.

Generally, the capacitor body may be formed of an internal electrode in which sintering starts at 600° C. and a dielectric in which sintering starts at 900° C. or higher.

To implement electrical properties of the multilayer capacitor, it may be necessary to densify the dielectric through a sintering process of 900° C. or higher. In the process of reducing the internal electrode of which a sintering initiation temperature is relative low and applying additional heat to sinter the dielectric, over-reduction of the internal electrode may occur such that pores may be formed in the internal electrode.

Moisture may rapidly penetrate into the capacitor body through the pores on the end of the internal electrode on the interfacial surface between the internal electrode and the dielectric layer, and this moisture penetration may cause peeling between the dielectric layer and the internal electrode, such that insulation resistance may decrease, and this decrease in insulation resistance may lead to a decrease in the moisture resistance reliability of the multilayer capacitor.

Therefore, to prevent deterioration of moisture resistance reliability, it may be important to block the moisture permeation path from the outside into the capacitor body, and to develop a general method of blocking such a penetration path through a composition of the external electrode and a structural design of the multilayer capacitor.

However, as the multilayer capacitor is miniaturized, the external electrode tends to have a reduced thickness, and there may be limitation in blocking the moisture permeation path with a limited structural design and the external electrode having a reduced thickness.

In the example embodiment, the dielectric and the internal electrode may be simultaneously sintered through a rapid temperature increase from the point at which the sintering of the internal electrode starts to the point at which the sintering of the dielectric starts, such that over-reduction of the internal electrode may be prevented.

Through this action, on the interfacial surface between the margin of the capacitor body and the internal electrode in the Y direction, no pores may be formed on the end of the internal electrode, the end may be filled with the dielectric, or may be filled with a glass phase formed by reaction between the elements formed from the dielectric or the internal electrode, such that porosity of the ends of the internal electrodes may be less than 50%.

By configuring the porosity of the ends of the internal electrodes to be less than 50% on the interfacial surface between the margin of the capacitor body in the Y direction and the internal electrodes through the simultaneous sintering of the internal electrodes and the dielectric, the moisture permeation path in the portion of the moisture permeation path corresponding to the interfacial surface between the internal electrodes and the margin of the dielectric may be almost blocked, and a decrease of insulation resistance of the multilayer capacitor may be prevented.

Accordingly, the moisture resistance reliability of the multilayer capacitor may improve without changing a material or other microstructural changes, and a multilayer capacitor having improved high reliability and high capacity may be provided in the high-temperature, high-humidity environment.

Hereinafter, a test may be performed to determine a correlation between porosity of the ends of the internal electrodes and moisture resistance reliability on the interfacial surface between a margin of the capacitor body in the Y direction and the internal electrodes.

Table 1 below lists the result of analyzing porosity of the ends of the internal electrodes in a chip with the deteriorated moisture resistance reliability and a chip with no deterioration in moisture resistance reliability.

In this case, the IR measurement conditions were a temperature of 85° C., humidity of 85%, a static pressure of 4V, and a time of 30 hours, and 40 samples were tested.

Also, in the chips (#1, 2) with deteriorated moisture resistance reliability, the porosity of the ends of the internal electrodes was 50% or more, and in the chips (#3, 4) in which formation of pores were prevented or reduced such that moisture resistance reliability was not deteriorated,

TABLE 1

| # | Classification | Note | Porosity of ends (%) | Initial IR | Final IR | Result of assessing reliability |
|---|---|---|---|---|---|---|
| 1 | Comparative example 1 | Chip with deteriorated moisture resistance reliability 1 | 55.6 | 1.50E+07 | 1.00E+04 | Deteriorated |
| 2 | Comparative example 2 | Chip with deteriorated moisture resistance reliability 2 | 67.0 | 2.70E+08 | 6.30E+05 | Deteriorated |
| 3 | Embodiment 1 | Chip with normal moisture resistance reliability 1 | 44.8 | 7.10E+08 | 5.70E+08 | Normal |
| 4 | Embodiment 2 | Chip with normal moisture resistance reliability 2 | 49.5 | 1.00E+09 | 1.00E+09 | Normal |

FIGS. 5 to 8 are graphs illustrating moisture resistance reliability according to porosity of ends of internal electrodes.

Here, as for porosity, three multilayer capacitors were prepared, the Y-Z surface was polished to a depth of about ½ in the X direction to expose the Y-Z cross-sectional surface, the number of pores on the interfacial surface between margins of the dielectric in contact with the internal electrode in the Y direction in the central position in the Z direction in 50 or more and 100 or less of the electrode layers was imaged using a SEM at a magnification of 30K, the number of the internal electrodes including pores on the ends thereof as compared to the number of internal electrode layers measured in the corresponding area by measuring the 50 or more and 100 or less of the layers, and an average value of the three porosity was calculated as the porosity of the ends.

Figure 5:
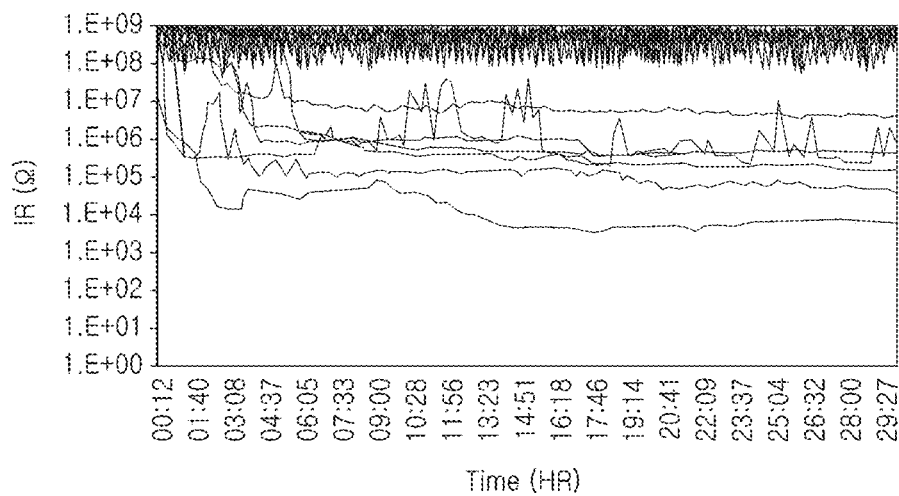
FIGS. 5 to 8 are graphs illustrating moisture resistance reliability depending on porosity of ends of internal electrodes.
Figure 6:
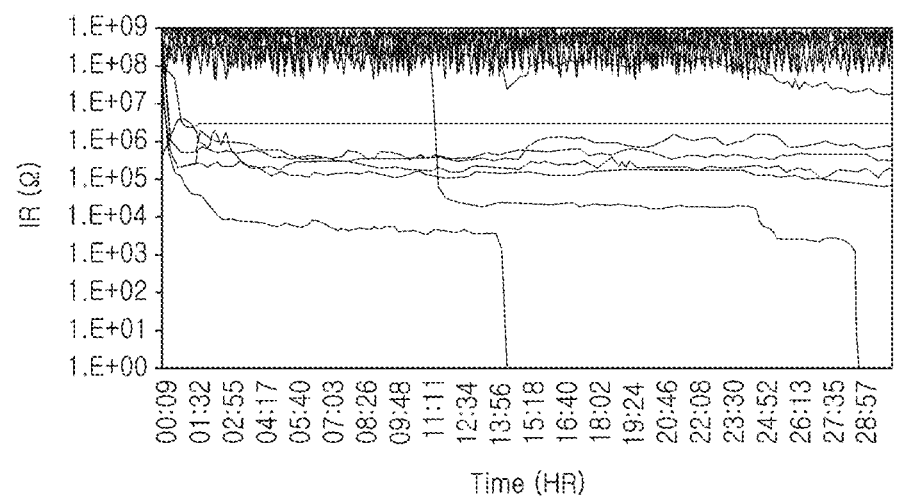
Figure 7:
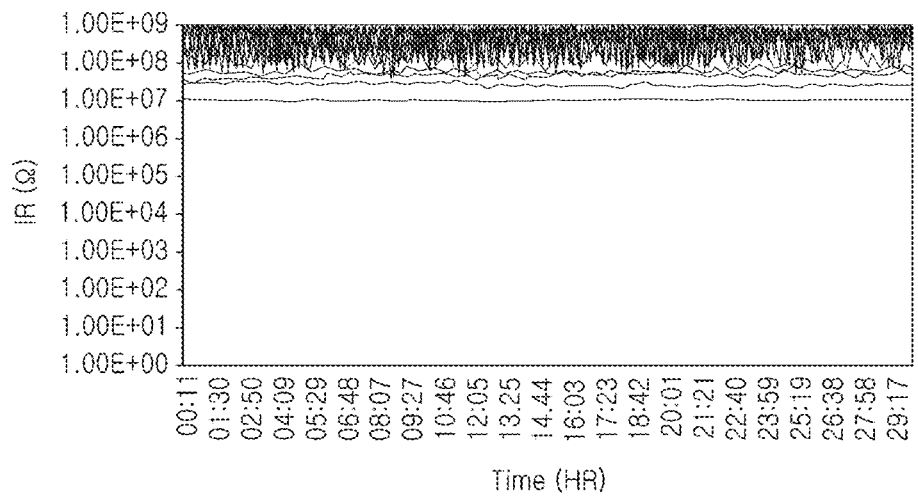
Figure 8:
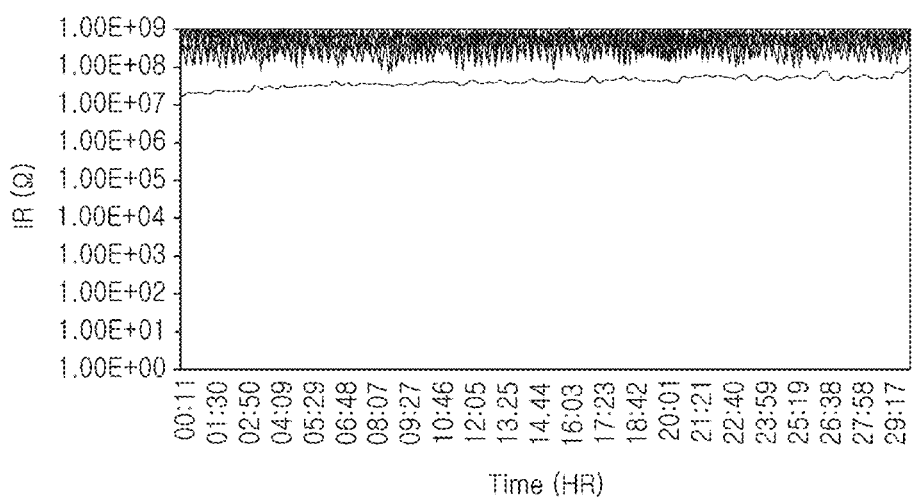

FIG. 5 illustrates changes in IR for #1, FIG. 6 illustrates changes in IR for #2, FIG. 7 illustrates changes in IR for #3, and FIG. 8 illustrates changes in IR for #4.

porosity of the ends of the internal electrodes was less than 50%.

Therefore, as in the example embodiment, when the porosity of the ends of the internal electrodes on the interfacial surface between the margin of the capacitor body in the Y direction and the internal electrodes is less than 50%, moisture resistance reliability may improve.

FIGS. 9 to 12 are SEM images illustrating an end of an internal electrode according to a temperature increase rate.

Here, the porosity is calculated by the same method as the method described above, and accordingly, the description thereof will not be provided. Also, the multilayer capacitor having a size of 0603 and the temperature properties of XSR, and a nominal capacity of 4 µF or more was used, the IR measurement conditions were temperature of 85° C., humidity of 85%, static pressure of 9.45V, 24 hours, and 40 samples were tested.

TABLE 2

| # | Classification | Note | Porosity of ends (%) | initial IR | Final IR | Result of assessing reliability |
|---|---|---|---|---|---|---|
| 9 | Comparative example 3 | Chip with deteriorated moisture resistance reliability 3 | 80.0 | 1.00E+09 | 2.80E+07 | Deteriorated |
| 10 | Embodiment 2 | Chip with normal moisture resistance reliability 2 | 24.0 | 1.00E+09 | 1.33E+08 | Normal |
| 11 | Embodiment 3 | Chip with normal moisture resistance reliability 3 | 27.0 | 3.01E+07 | 1.09E+07 | Normal |

Referring to Table 1 and FIGS. 5 to 8, in the comparative example, in #1, as for the IR degradation rate, 7 out of 40 were defective, indicating a degradation rate of 18%, and in #2, as for the IR degradation rate, 7 out of 40 were defective, indicating a deterioration rate of 18%. In the embodiment, no defects appeared in #3 and #4.

Figure 14:
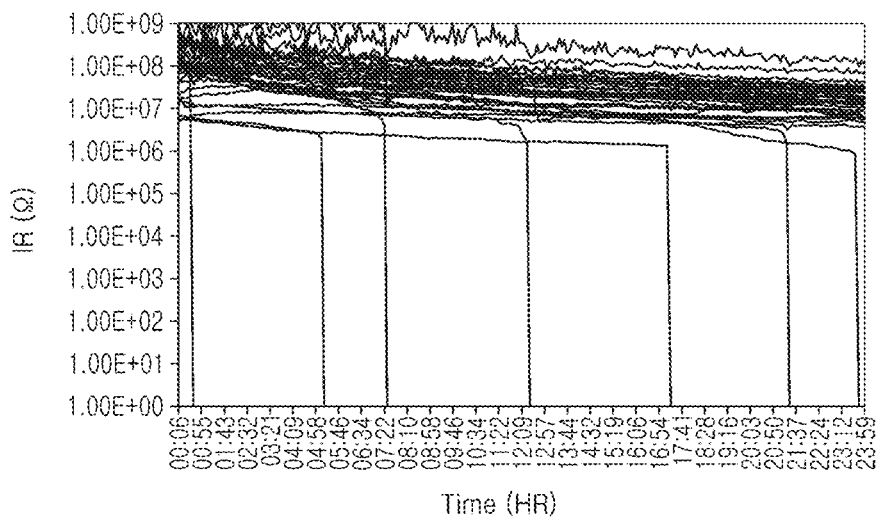
FIGS. 14 to 16 are graphs illustrating moisture resistance reliability depending on porosity of ends of internal electrodes.
Figure 15:
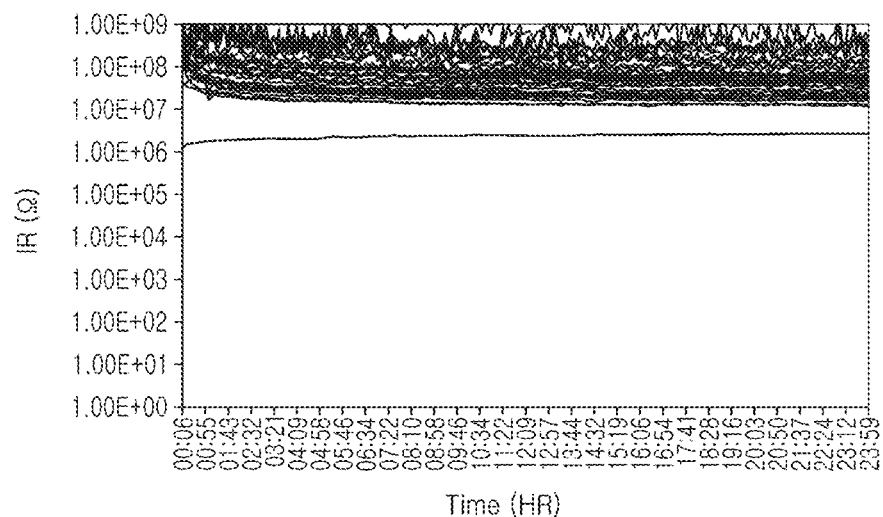
Figure 16:
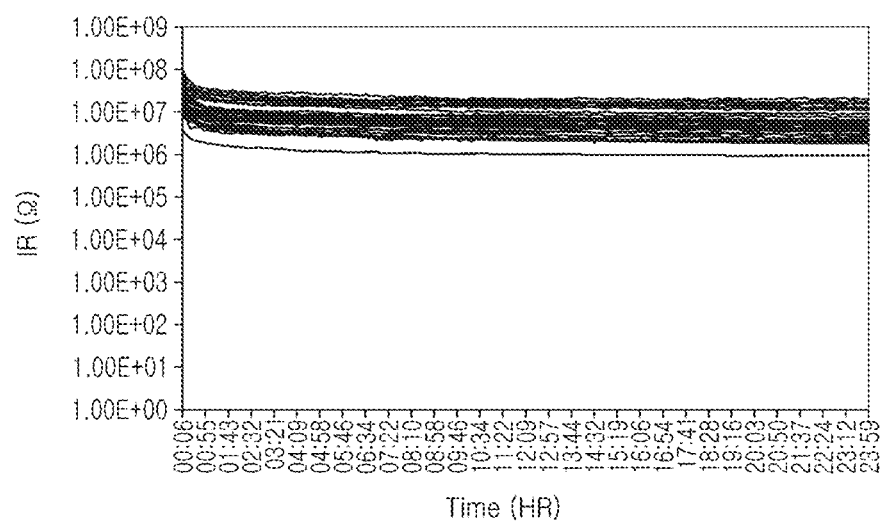

FIG. 14 illustrates changes in IR for #9, FIG. 15 illustrates changes in IR for #10, and FIG. 16 illustrates changes in IR for #11.

Referring to Table 2 and FIGS. 14 to 16, in the comparative example, in #9, as for the IR degradation rate, 7 out of 40 were defective, indicating a degradation rate of 18%, and in #10 in which the porosity was 24%, as for the IR degradation rate, 0 out of 40 was defective, indicating that no defects appeared. In #11 in which the porosity was 27%, as for the IR degradation rate, 0 out of 40 was defective, indicating that no defects appeared.

Also, in the chip (#9) with deteriorated moisture resistance reliability, the porosity of the ends of the internal electrodes was 50% or more, and in the chips (#10, 11) with no deterioration in moisture resistance reliability, porosities on the ends of the internal electrodes were 24% and 27%, respectively, less than 50%.

It may be predicted that the probability of defects in the multilayer capacitor may decrease as the porosity of the ends of the internal electrodes on the interfacial surface between the margin of the capacitor body in the Y direction and the internal electrode decreases, but according to the experiment, the porosity was not decreased to less than 24%.

Therefore, based on Tables 1 and 2, the level on which the porosity of the ends of the internal electrodes on the interfacial surface between the margin of the capacitor body in the Y direction and the internal electrode may prevent deterioration of the moisture resistance reliability of the multilayer capacitor may be 24% or more and less than 50%.

Also, a test to find out the difference in porosity of the ends of the internal electrodes and moisture resistance reliability according to the temperature increase rate was performed.

To this end, a multilayer capacitor designed with a general dielectric and internal electrode composition to have the temperature characteristics of X5R and a nominal capacity of 22 μF was prepared, and as illustrated in Table 3 below, four samples in which the degree of formation of pores of the end of the internal electrode was controlled by differentiating the temperature increase rate from the temperature at which sintering of the internal electrode starts to the temperature at which sintering of the dielectric starts were pared, and a difference in moisture resistance reliability was analyzed through a microstructure and changes in IR.

TABLE 3

| # | temperature increase rate (° C./min) | Porosity of ends of internal electrodes (%) | Moisture resistance reliability |
|---|---|---|---|
| 5 | 1,000 | 82 | 30% of deterioration |
| 6 | 2,000 | 67 | 20% of deterioration |
| 7 | 3,000 | 38 | No deterioration |
| 8 | 3,000 | 45 | No deterioration |

Table 3 lists the results of evaluating the porosity and moisture resistance reliability of the ends of the internal electrodes according to the temperature increase rate when the laminate is fired in the process of manufacturing the multilayer capacitor.

FIGS. 9 to 12 are SEM images of the ends of the internal electrodes of #5 to #8, respectively.

Figure 9:
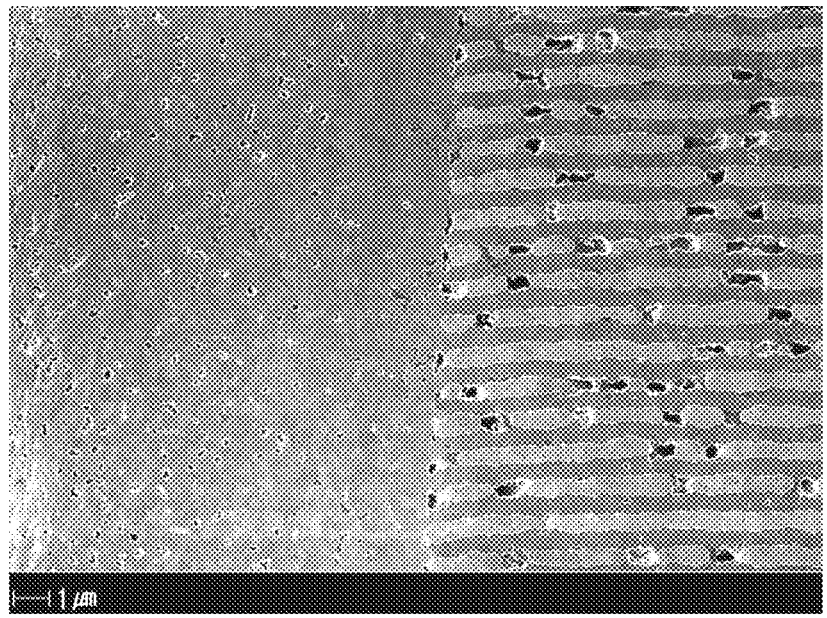
FIGS. 9 to 12 are SEM images illustrating an end of an internal electrode depending on a temperature increase rate.
Figure 10:
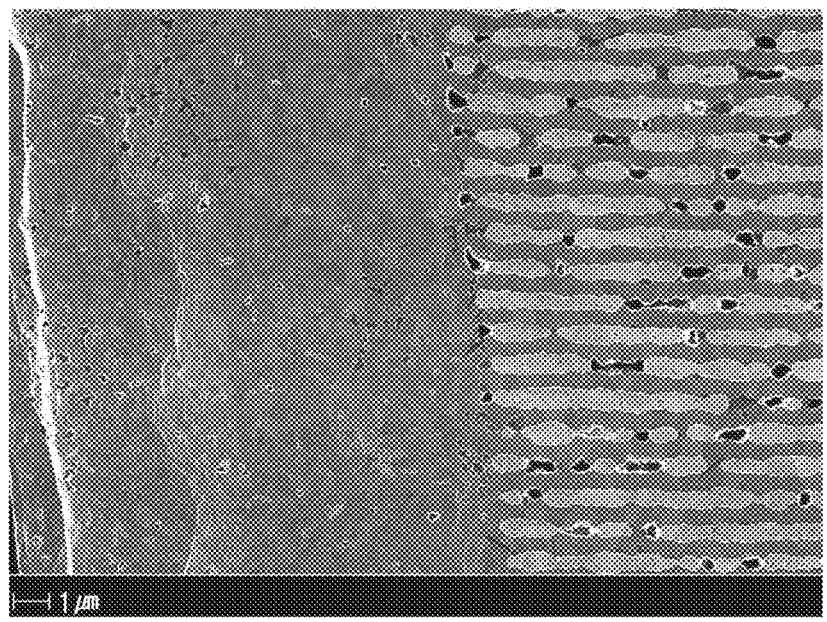
Figure 11:
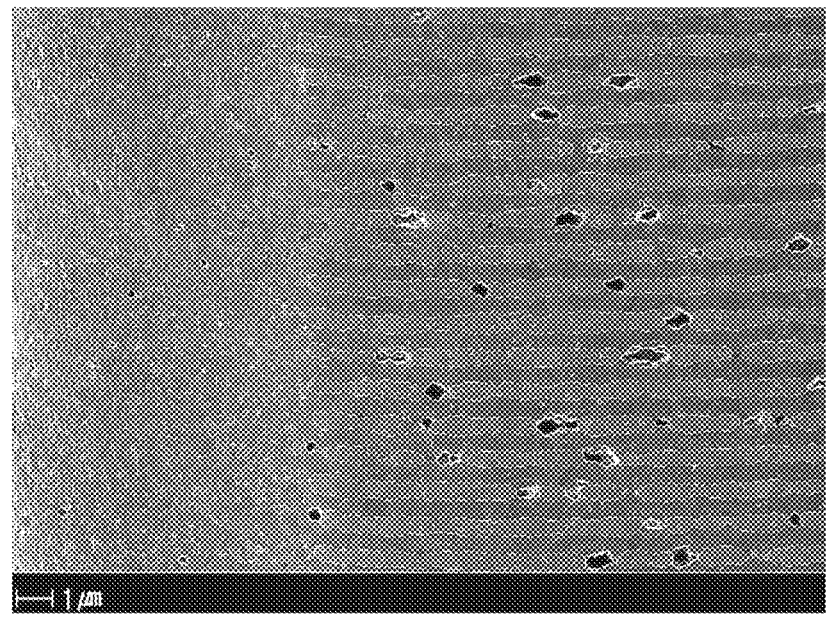

Referring to Table 3, #5 and #6 are comparative examples, and when the temperature increase rate is less than 3,000° C./min as in #5 and #6, while the internal electrode is pre-reduced as compared to the dielectric, the internal electrode may overly be reduced by additional heat for densifying the dielectric, and accordingly, a large amount of pores were formed in the end of the internal electrode, 50% or more, as in FIGS. 9 and 10.

Figure 12:
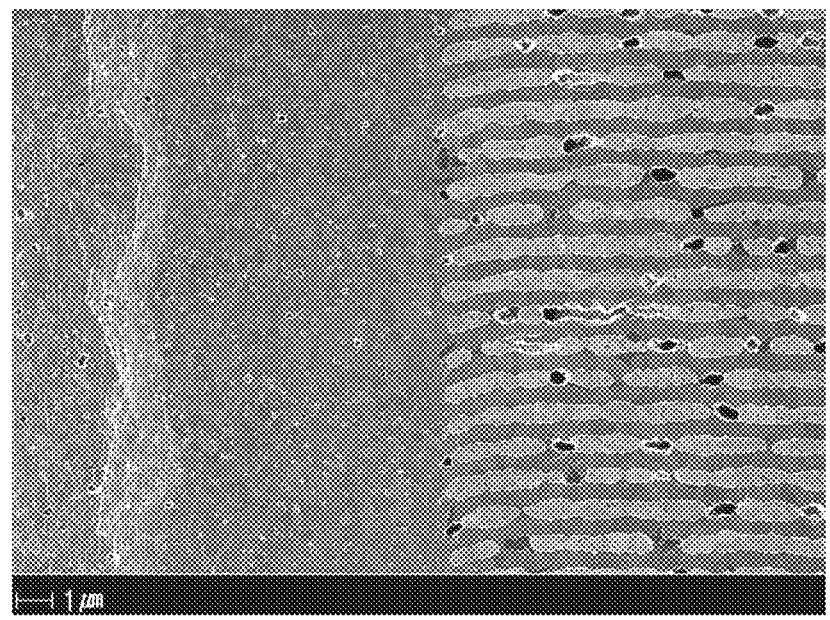

As in #7 and #8, however, when the temperature rapidly increases at 3,000° C./min or more, sintering of the internal electrode and the dielectric was simultaneously performed, such that the reduction rates of the internal electrode and the dielectric may be similar. Accordingly, as shown in FIG. 12, no pores were formed in the ends of the internal electrodes, the pores of the ends of the internal electrodes were filled by densification of the dielectric, or the glass phase formed from the dielectric or internal electrodes filled the pores of the ends of the internal electrodes, such that the porosity of the ends of the internal electrodes may be reduced to less than 50%.

Thus, the temperature increase rate when baking the laminate may be preferably 3000° C./m or more, and the effect of simultaneous baking of the dielectric and the internal electrode may be reduced at a rate lower than the above rate, such that the pores may be formed in the end of the internal electrode by 50% or more.

Figure 13:
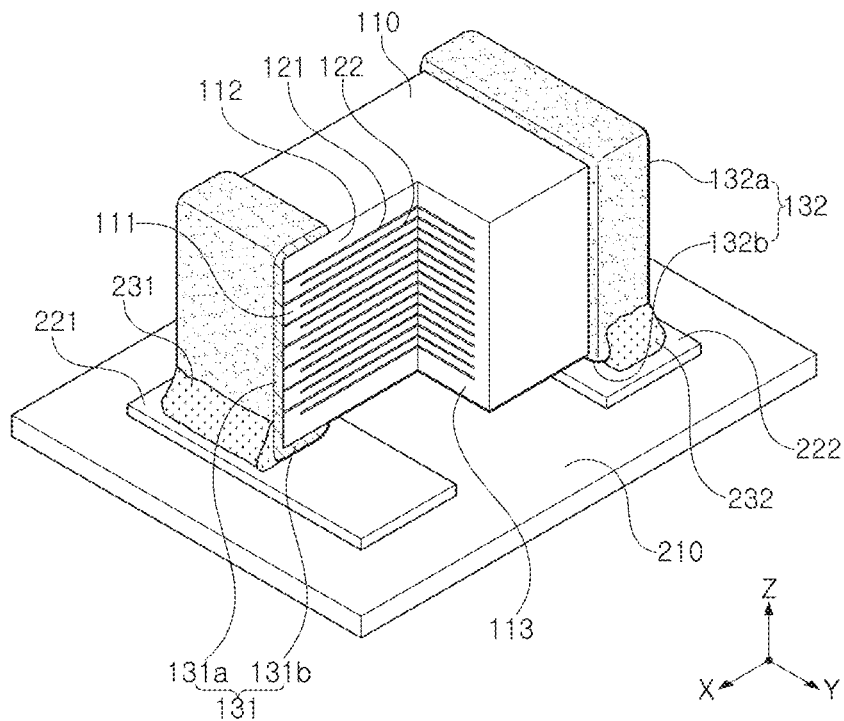
FIG. 13 is a perspective diagram illustrating mounting structures of a multilayer capacitor and a board according to an example embodiment of the present disclosure.

FIG. 13 is a perspective diagram illustrating mounting structures of a multilayer capacitor and a board according to an example embodiment.

Referring to FIG. 13, the board on which the multilayer capacitor is mounted in an example embodiment may include a board 210 on which the multilayer capacitor 100 is mounted, and first and second electrode pads 221 and 222 spaced apart from each other on the upper surface of the board 210.

In the multilayer capacitor 100, the first and second external electrodes 131 and 132 may be connected to the first and second electrode pads 221 and 222 to be in contact with the first and second electrode pads 221 and 222 and may be mounted on the board 210.

In this case, the first external electrode 131 may be bonded and electrically and physically connected to the first electrode pad 221 a solder 231, and the second external electrode 132 may be bonded and electrically and physically connected to the second electrode pad 222 by a solder 232.

Here, the multilayer capacitor 100 may be implemented by the multilayer capacitor described in the example embodiments described above, and a detailed description thereof will not be provided to avoid overlap.

According to the aforementioned example embodiment, by configuring the porosity of the ends of the internal electrodes to be less than 50% on the interfacial surface between the margin of the capacitor body in the width direction and the internal electrodes, moisture resistance reliability of the multilayer capacitor may improve.

While the example embodiments have been illustrated and described above, it will be apparent to those skilled in the art that modifications and variations could be made without departing from the scope in the example embodiment as defined by the appended claims.

What is claimed is:
1. A multilayer capacitor, comprising:
a capacitor body including dielectric layers and internal electrodes alternately disposed with the dielectric layers interposed therebetween; and
an external electrode disposed on the capacitor body to be connected to one or more of the internal electrodes,
wherein porosity of ends of the internal electrodes is 24% or more and less than 50% on an interfacial surface between a margin of the capacitor body in a width direction of the capacitor body and the internal electrodes.
2. The multilayer capacitor of claim 1,
wherein the capacitor body includes first and second surfaces opposing each other in a first direction, and third and fourth surfaces opposing each other in a second direction different from the first direction, wherein the internal electrodes include first and second internal electrodes alternately disposed in the first direction, and wherein the external electrode includes first and second external electrodes disposed on third and fourth surfaces of the capacitor body and connected to the first and second external electrodes, respectively.

3. The multilayer capacitor of claim 2, wherein the capacitor body includes an active region in which the first and second internal electrodes overlap each other in the first direction, and upper and lower covers disposed on upper and lower surfaces of the active region, respectively.

4. The multilayer capacitor of claim 1, further comprising: a plating layer disposed on the external electrode.

5. The multilayer capacitor of claim 1, wherein the capacitor body is baked by raising a temperature from 600° C. to 900° C. at a rate of 3000° C./min or more during baking.

6. A board on which a multilayer capacitor is mounted, the board comprising:

a board having electrode pads on one surface of the board; and a multilayer capacitor having an external electrode connected to one of the electrode pads, wherein the multilayer capacitor includes a capacitor body including dielectric layers and internal electrodes alternately disposed with the dielectric layers interposed therebetween; and the external electrode disposed on the capacitor body to be connected to one or more of the internal electrodes, and porosity of ends of the internal electrodes is 24% or more and less than 50% on an interfacial surface between a margin of the capacitor body in a width direction of the capacitor body and the internal electrodes.

7. The board of claim 6, wherein the capacitor body is baked by raising a temperature from 600° C. to 900° C. at a rate of 3000° C./min or more during baking.

8. A multilayer capacitor, comprising:

a capacitor body including dielectric layers and internal electrodes alternately disposed with the dielectric layers interposed therebetween, the capacitor body including first and second surfaces opposing each other in a thickness direction of the capacitor body, third and fourth surfaces opposing each other in a length direction of the capacitor body, and fifth and sixth surfaces opposing each other in a width of the capacitor body, and the internal electrodes including first internal electrodes extending from the first surface and the second internal electrodes extending from the second surface; and first and second external electrodes disposed on the third surface and the fourth surface to be connected to the first internal electrodes and the second internal electrodes, respectively, wherein in a width direction-thickness direction plane, a ratio of the number of internal electrodes each having a pore at an end thereof located at a side of one the fifth and sixth surfaces to the number of the internal electrodes is greater than 0 and less than 50%.

9. The multilayer capacitor of claim 8, wherein the ratio is 24% or more.

* * * * *